United States Patent
Lee et al.

(10) Patent No.: US 9,643,866 B2
(45) Date of Patent: May 9, 2017

(54) METHOD FOR TREATING WATER BY USING SALT DESORPTION PROCESS OF GAS HYDRATE

(71) Applicant: KOREA INSTITUTE OF INDUSTRIAL TECHNOLOGY, Cheonan-si (KR)

(72) Inventors: Ju Dong Lee, Busan (KR); Hyoung Jae Kim, Busan (KR); Joung Ha Kim, Cheonan-si (KR); Jae Il Lim, Daegu (KR)

(73) Assignee: Korea Institute of Industrial Technology (KR)

( * ) Notice: Subject to any disclaimer, the term of this patent is extended or adjusted under 35 U.S.C. 154(b) by 159 days.

(21) Appl. No.: 14/421,953

(22) PCT Filed: Aug. 16, 2013

(86) PCT No.: PCT/KR2013/007399
§ 371 (c)(1),
(2) Date: Feb. 16, 2015

(87) PCT Pub. No.: WO2014/027862
PCT Pub. Date: Feb. 20, 2014

(65) Prior Publication Data
US 2015/0232354 A1    Aug. 20, 2015

(30) Foreign Application Priority Data
Aug. 17, 2012 (KR) .......................... 10-2012-0090329

(51) Int. Cl.
*C02F 1/68* (2006.01)
*C02F 103/08* (2006.01)
*C02F 101/10* (2006.01)

(52) U.S. Cl.
CPC ............ *C02F 1/68* (2013.01); *C02F 2101/10* (2013.01); *C02F 2103/08* (2013.01); *C02F 2303/18* (2013.01)

(58) Field of Classification Search
None
See application file for complete search history.

(56) References Cited

U.S. PATENT DOCUMENTS 5,873,262 A * 2/1999 Max .......................... C02F 1/22
                                                            62/532
6,767,471 B2 * 7/2004 Max ...................... B01D 53/62
                                                            210/150

(Continued)

FOREIGN PATENT DOCUMENTS

JP      11-319805 A     11/1999
KR  10-2006-0113125 A   11/2006

(Continued)

OTHER PUBLICATIONS

International Search Report in corresponding PCT/KR2013/007399.

*Primary Examiner* — Chester Barry
(74) *Attorney, Agent, or Firm* — Hovey Williams LLP

(57) ABSTRACT

A method for treating water using a salt desorption process of gas hydrates according to the present invention includes: (a) introducing water containing impurities and a plurality of guest gases into a reactor; (b) forming gas hydrates by causing the water and the plurality of guest gases to react under a first condition; and (c) dissociating a gas hydrate of one guest gas from among the plurality of guest gases by changing the first condition to a second condition, wherein the first condition refers to temperature and pressure conditions under which all of the plurality of guest gases form gas hydrates and the second condition refers to temperature and (Continued)

Hydrate pellet      Decomposition step pressure conditions under which the gas hydrate of the one guest gas from the mixed gas hydrates is dissociated.

9 Claims, 4 Drawing Sheets

(56) References Cited

U.S. PATENT DOCUMENTS

| | | | | |
|---|---|---|---|---|
| 7,560,028 B1* | 7/2009 | Simmons | ............... | C02F 1/22 |
| | | | | 205/747 |
| 2007/0100178 A1* | 5/2007 | Carstens | ............... | B01J 7/02 |
| | | | | 585/15 |
| 2011/0233147 A1* | 9/2011 | Hayafuji | ............... | C02F 1/22 |
| | | | | 210/766 |

FOREIGN PATENT DOCUMENTS

| | | | |
|---|---|---|---|
| KR | 10-0737183 B1 | 7/2007 | |
| KR | 10-2009-0122811 A | 12/2009 | |
| WO | 99/00330 A1 | 1/1999 | |
| WO | 2007/145740 A2 | 12/2007 | |

* cited by examiner

METHOD FOR TREATING WATER BY USING SALT DESORPTION PROCESS OF GAS HYDRATE

RELATED APPLICATIONS

This application claims priority to PCT International Patent Application No. PCT/KR2013/007399, filed Aug. 16, 2013, which claims the priority benefit to Korean Patent Application No. 10-2012-0090329, filed on Aug. 17, 2012, both of which are hereby incorporated by reference in their entirety.

TECHNICAL FIELD

The present invention relates to a method for treating water using a salt desorption process of gas hydrates, and more particularly to a method for treating water using a salt desorption process of gas hydrates, which utilizes the difference in dissociation pressure of different gases with different gas hydrate phase equilibrium pressures in the process of purifying water or removing salts contained in an aqueous solution by preparing gas hydrates and, thereby, efficiently removes or separates impurities, salt, etc., attached to the crystals of the gas hydrates.

BACKGROUND ART

A clathrate hydrate or gas hydrate consists of a host molecule, which forms a hydrogen-bonded solid lattice, and a guest molecule (hereinafter, a guest gas) trapped inside the lattice. It refers to a crystalline compound wherein small molecules such as methane, ethane, carbon dioxides, etc., are physically trapped inside the three-dimensional lattice structure formed by hydrogen-bonded water molecules, without any chemical bonding.

The gas hydrate was first discovered in 1810 by Sir Humphry Davy of England. He reported during his Bakerian Lecture to the Royal Society of London that, when chlorine reacts with water, a compound resembling ice is formed, but the temperature thereof is higher than 0° C. Michael Faraday first found in 1823 that a gas hydrate is formed by a reaction of 10 water molecules with one chlorine molecule. Until now from then, the gas hydrate has been continuously studied as one of phase-change materials (PCMs). The main subjects of the study include phase equilibrium and formation/dissociation conditions, crystal structure, coexistence of different crystals, competitive compositional change in the cavity, etc. Besides, various detailed researches are being conducted in microscopic and macroscopic aspects.

At present, it is known that about 130 kinds of guest gases can be trapped in the gas hydrate. Examples include $CH_4$, $C_2H_6$, $C_3H_8$, $CO_2$, $H_2$, $SF_6$, etc. The crystal structure of the gas hydrate has a polyhedral cavity which is formed by hydrogen-bonded water molecules. Depending on the kind of the gas molecule and the condition of its formation, the crystal structure may vary to have a body-centered cubic structure I (sI), a diamond cubic structure II (sII) or a hexagonal structure H (sH). The sI and sII structures are determined by the size of the guest molecule and, in the sH structure, the size and the shape of the guest molecule are important factors.

The guest molecule of the gas hydrate naturally occurring in the deep sea and permafrost areas is mainly methane, and it has received attention as an environment-friendly clean energy source due to a small amount of carbon dioxide ($CO_2$) emissions during combustion. Specifically, the gas hydrate may be used as an energy source to replace traditional fossil fuels and also for storage and transportation of solidified natural gas using the hydrate structure. Further, it may be used for separation and storage of $CO_2$ to prevent global warming and may also be usefully used in seawater desalination apparatuses to dissociate gases or aqueous solutions.

Since the seawater provided as the host molecule contains various minerals including salts, a desalination process of separating the salts, etc., is necessary to use the components or to obtain fresh water for drinking. Several methods of desalinating the seawater have been presented and are practically employed in desalination facilities.

The most representative techniques of seawater desalination are evaporation method (thermal method) and reverse osmosis (RO) method. Because the evaporation method is a process of producing fresh water by evaporating and then condensing the seawater, it consumes a lot of energy and is uneconomical. The reverse osmosis method has been favored recently because it consumes less energy compared to the evaporation method. However, the biggest disadvantage of the reverse osmosis method is that the reverse osmosis membrane should be replaced periodically due to membrane fouling, thus increasing maintenance cost. Sufficient pretreatment is required for its resolution but when the seawater has a high salt concentration or contains many impurities the process maintenance cost will increase exponentially.

In addition to the above two methods, new methods for treating water based on the principle of forming gas hydrate, for example, aquatic resources concentration, drug separation, vitamin purification, wastewater treatment, water purification, brackish water desalination, seawater desalination, etc., have been developed. Of them, the seawater desalination process, for example, is characterized in that only pure water is used in the reaction for the formation of gas hydrate contaminants or salts contained in the seawater are excluded naturally. That is to say, the salts (e.g., NaCl) contained in the seawater are excluded when the gas hydrate is formed and the solid-state hydrate can be easily separated from the salt-rich filtrate. By dissociating the separated gas hydrate, pure water exclusive of the salts and contaminants can be produced.

The seawater desalination method based on the principle of gas hydrate formation allows the production of fresh water under mild conditions via a simple process. For example, when propane or fluoride gas is used as the hydrate medium, pure water can be separated under the condition of 5° C. and 5-10 atm. Since the system pressure of the seawater desalination method is lower than that of the reverse osmosis method requiring a pressure of 50-80 atm, and the method requires no additional cost for, e.g., replacement of membranes, fresh water can be produced at low cost. In order to separate the salt-excluded gas hydrate and the impurity-concentrated residual solution in the seawater desalination process using the gas hydrate method or a similar water treatment process, a dehydration process is essentially required. After the dehydration process, the hydrate crystals are compressed and packed. The core technology in the gas hydrate method is to efficiently separate/wash off the contaminants attached to the dehydrated and compressed solid-state hydrate crystals or the impurities between the crystals in order to obtain more purified water than that obtained by dissociation of the hydrate.

More specifically, the existing processes for seawater desalination disclosed in the references are as follows.

Both Korean Patent No. 10-0737183 and Korean Patent Application Publication No. 10-2009-0122811 provide a method or an apparatus for desalinating seawater using a gas hydrate. According to these patents, a gas hydrate is formed by injecting a single guest gas into a reaction chamber containing seawater. The gas hydrate is dehydrated and compressed to remove the impurities adsorbed on an outer surface of the gas hydrate. Finally, it is separated into fresh water and a gas by dissociation to thereby obtain fresh water. These methods are characterized in that, when the seawater and the guest gas are mixed in the reaction chamber, the formation of the hydrate is accelerated by spraying or using, e.g., a reaction promoter, while concurrently salts are dissociated from the seawater by separating the impurities during the dehydration process. However, although part of the impurities can be removed during the dehydration step, they lack the technical feature of efficiently removing the salts or contaminants attached to the surface of the gas hydrate crystals and between the crystals to obtain more purified water.

Meanwhile, International publication No. WO99/000330 (Jun. 17, 1998) [Marine Desalination Systems L.L.C. (US)] adopts a method of forming a gas hydrate by injecting a guest gas (methane) into a vertically long (a few hundred meters) column positioned vertically in a body of seawater and obtaining fresh water at a top portion of the column, and International publication No. WO07/145740 (May 8, 2007) [Marine Desalination Systems L.L.C. (US)] aims at improving productivity by continuously performing hydrate formation and dissociation using a HART module.

However, although these patents aim at improving the efficiency of gas hydrate formation in manufacturing gas hydrate, their efficiencies of salt removal are not substantially high. Although it is necessary to efficiently remove the impurities attached to the surface of the gas hydrate crystals and between the crystals during the hydrate formation process as described above, these patents lack such a technical feature. In addition, most patents relating to seawater desalination or water treatment using a gas hydrate merely mention a guest gas without specifying the gas. If only one guest gas is used, dissociation occurs in short time when pure water is obtained by dissociating the gas hydrate. As a result, the impurities present on the surface of the gas hydrate crystals or between the crystals cannot be efficiently removed and there is a limitation in obtaining pure water.

As described above, although techniques that allow for water treatment based on the principle of gas hydrate are being developed, they merely accelerate the formation of the gas hydrate using an ultrasonic apparatus, a reaction promoter, etc., and are limited in efficiently removing impurities such as salts.

(Patent document 1) Korean Patent No. 10-0737183 (Jul. 10, 2007) (Dowell Technology Co., Ltd.).

(Patent document 2) Korean Patent Application Publication No. 10-2009-0122811 (Dec. 1, 2009) (Korean Institute of Industrial Technology).

(Patent document 3) International publication WO99/000330 (Jun. 17, 1998) [Marine Desalination Systems L.L.C. (US)].

(Patent document 4) International publication WO07/145740 (May 8, 2007) [Marine Desalination Systems L.L.C. (US)].

DISCLOSURE

Technical Problem

In order to solve the above-described problem, the present invention is directed to providing a method for treating water, which includes injecting a host molecule and a plurality of guest gases with different gas hydrate phase equilibrium pressures into a reactor, separating gas hydrates by stirring, dehydration and compression and dissociating a guest gas with a higher phase equilibrium pressure first by lowering pressure and then inducing the dissociation of the guest gas with a lower phase equilibrium pressure by sequentially lowering the pressure so as to efficiently wash off and remove impurities present on the surface of the hydrate crystals and between the crystals, thereby allowing prevention of water purification capacity due to rapid dissociation and effective removal or separation of the impurities mixed in the gas hydrates.

Technical Solution

In an aspect, the present invention provides a method for treating water using a salt desorption process of gas hydrates, including: (a) introducing water containing impurities and a plurality of guest gases into a reactor; (b) forming gas hydrates by reacting the water with the plurality of guest gases under a first condition; and (c) dissociating a gas hydrate of one guest gas from among the plurality of guest gases by changing the first condition to a second condition, wherein the first condition refers to temperature and pressure conditions under which all the plurality of guest gases form gas hydrates and the second condition refers to temperature and pressure conditions under which the one guest gas from the mixed gas hydrates is dissociated.

Preferably, the method for treating water may further include: (d) rinsing the dissociated one guest gas, the water, and the impurities.

Preferably, the method for treating water may further include: (e) dissociating a gas hydrate of another guest gas from among the plurality of guest gases by changing the second condition to a third condition, wherein the third condition refers to temperature and pressure conditions under which the gas hydrates of all of the plurality of guest gases are dissociated.

Preferably, the plurality of guest gases may be composed of a first guest gas and a second guest gas, the pressure of the second condition under which the first guest gas is dissociated may be higher than 5 atm and equal to or lower than 50 atm at 0-20° C. and the pressure of the third condition under which the second guest gas is dissociated may be higher than normal pressure and equal to or lower than 20 atm at 0-20° C.

Preferably, the method for treating water may further include: (f) dehydrating the formed gas hydrates.

Preferably, the method for treating water may further include: (g) introducing at least one guest gas from among the dissociated plurality of guest gases again into the reactor.

Preferably, the method for treating water may further include: (h) collecting the rinsed impurities in a reservoir and introducing them again into the reactor.

Preferably, the method for treating water may be applied to any of a group consisting of a seawater desalination process, a wastewater treatment process, a brackish water desalination process, a water purification process, an aquatic resources concentration process and a separation process.

Preferably, the plurality of guest gases may be at least two selected from the group consisting of $CH_4$, $C_2H_6$, $C_3H_8$, $CO_2$, $H_2$, HFCs, PFCs, $Cl_2$ and $SF_6$.

Advantageous Effects

As described above, the method for treating water using a salt desorption process of gas hydrates according to the present invention allows for removal of impurities such as salts mixed in gas hydrates via a process of reacting a host molecule with a plurality of guest gases introduced into a reactor to prepare the gas hydrates and sequentially dissociating the plurality of guest gases by lowering the pressure of phase change.

In addition, while the existing method for producing fresh water involves the use of the produced fresh water or brackish water for washing of the gas hydrates, resulting in the decrease of yield of fresh water and disadvantages from the aspects of cost-effectiveness and productivity, the method of the present invention resolves such a problem and provides improved removal efficiency of impurities and salts as well as saving of the pure water.

BEST MODE FOR CARRYING OUT INVENTION

The above and other objects, features and advantages of the present invention will become more apparent from the following description of certain exemplary embodiments given in conjunction with the accompanying drawings. The described exemplary embodiments are provided for illustrative purposes only and are not intended to limit the technical scope of the present invention.

An apparatus for water treatment, which is used for the method for treating water using a salt desorption process of gas hydrates according to the present invention, may be prepared integrally or separately, as necessary. Also, some of its components may be omitted depending on the mode of operation.

The apparatus for water treatment according to the present invention may be used for various water treatment processes, such as a seawater desalination process, a wastewater treatment process, a brackish water desalination process, a water purification process, an aquatic resources concentration process, a separation process, etc.

Hereinafter, the method for treating water using a salt desorption process of gas hydrates according to the present invention will be described in detail with reference to the accompanying drawings. Although only an apparatus for seawater desalination is described in the present invention as an example of water treatment using a salt desorption process of gas hydrates, the present invention is not limited thereto.

As used herein, the 'guest gas' refers to a gas which forms a gas hydrate by binding to a host molecule injected into a reactor and 'water' means the host molecule. The guest gas may be, for example, $CH_4$, $C_2H_6$, $C_3H_8$, $CO_2$, $H_2$, HFCs, PFCs, $Cl_2$, $SF_6$, etc.

A reaction intermediate produced in the method for treating water is referred to as a gas hydrate and a process of preparing the gas hydrate into pellets is referred to as pelletizing. Although the present invention provides a method for treating water using a process of preparing and dissociating gas hydrates, it may also be applied to prepare gas hydrate pellets.

Overall Configuration of Desalination Apparatus 100

Figure 1:
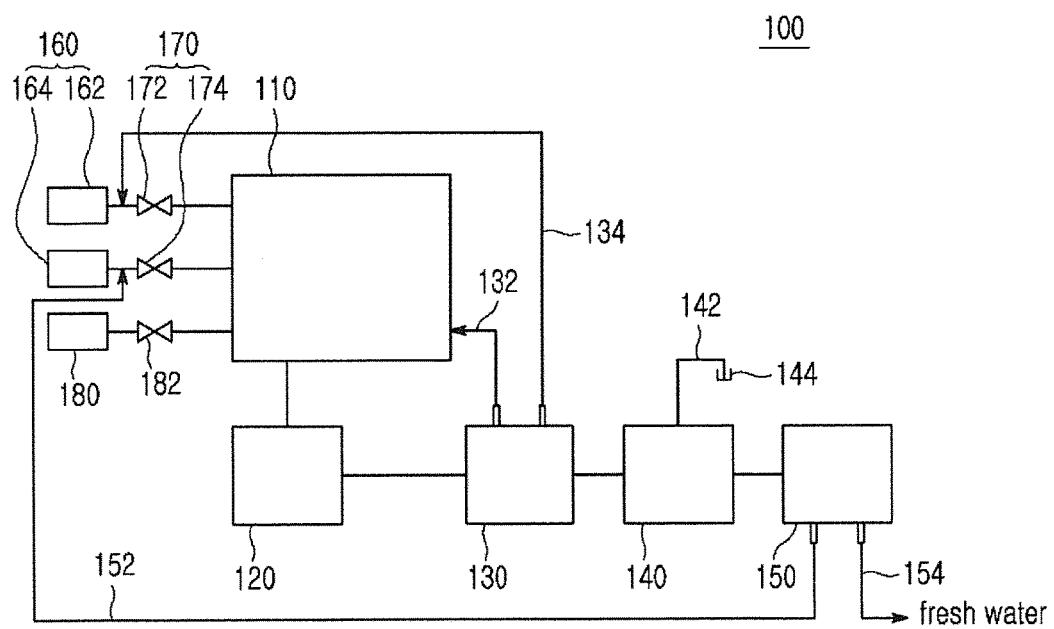
FIG. 1 shows the overall configuration of an apparatus for preparing gas hydrates according to the present invention, wherein a water treatment process is conducted using a plurality of guest gases.

First, the overall configuration of a desalination apparatus 100 used in the present invention will be described referring to FIG. 1.

The desalination apparatus 100 according to the present invention may be equipped with a temperature sensor and a pressure sensor at a reactor/supply sources/tanks and the sensors may be connected to and controlled by a controller. However, the sensors and the controller are not shown in the figure for the purpose of illustration.

In addition, although a control unit for a user to input operation parameters and to control the operation of the desalination apparatus 100 may be connected to the controller, it is also not shown in the figure for the purpose of illustration.

The figure is only a simplified schematic diagram for describing an exemplary embodiment of the desalination apparatus 100 according to the present invention and the scope of the present invention is not limited by the positions, arrangements, connections, etc. of the components shown in the figure.

The desalination apparatus 100 includes a reactor 110 wherein gas hydrates are formed from water and a plurality of guest gases under a first condition, a dehydration tank 120 which prepares crystallized gas hydrates by compressing a gas hydrate slurry formed in the reactor 110, a first dissociation tank 130 which dissociates a first gas and impurities from the crystallized gas hydrates discharged from the dehydration tank 120 by changing the first condition to a second condition, a rinsing tank 140 which washes the gas hydrates transferred from the first dissociation tank 130 using pure water, a second dissociation tank 150 which dissociates a second gas and fresh water from the gas hydrates transferred from the rinsing tank 140 by changing the second condition to a third condition, a gas supply source 160 which supplies the guest gases to the reactor 110, a gas control valve 170 which is disposed at a pipeline between the gas supply source 160 and the reactor 110, and a host molecule supply source 180 which supplies water to the reactor 110.

In the present invention, the host molecule supply source 180 may supply a mixture wherein various salts and contaminants are contained in pure water, such as seawater.

The dehydration tank 120 may be installed separately from the reactor 110 or integrally with the reactor 110 so as to perform the hydration. Because only pure water is used in the reaction whereby the gas hydrates are formed, the contaminants or salts contained in the seawater are excluded naturally. That is to say, the salts (e.g., NaCl) contained in the seawater are excluded out of crystals during the formation of the gas hydrates and only the solid-state hydrates and a salt-rich residual solution remain in the reactor 110. The dehydration tank 120 can produce the gas hydrates with the salts and contaminants excluded by hydrating and separating the contaminant-rich residual solution from the gas hydrate crystals. In case the dehydration tank 120 and the reactor 110 are installed separately, the salt-rich water and contaminants may be recycled from the dehydration tank 120 into the reactor 110 to be used as a supply source of fresh water.

The rinsing tank 140 may also be installed separately from the first dissociation tank 130 and the second dissociation tank 150, or integrally with the first dissociation tank 130 and the second dissociation tank 150 so as to perform the rinsing.

The first condition is defined as temperature and pressure conditions under which all of the plurality of guest gases form gas hydrates, the second condition is defined as temperature and pressure conditions under which the gas hydrate of only one guest gas from among the plurality of guest gases is dissociated, and the third condition is defined as temperature and pressure conditions under which the gas hydrates of all of the plurality of guest gases are dissociated.

In the reactor 110, the water and the plurality of guest gases are introduced and reacted to generate the gas hydrate as crystals. Although not shown in the figure, the reactor 110 may further include an additional stirring device (not shown) for stirring the introduced materials, a sensor (not shown), a heater (not shown) for melting the introduced materials if they are frozen, an additional device (not shown) for checking the concentration of the contaminants and transferring them to a reservoir, or the like.

The first dissociation tank 130 provides the second condition the pressure of which is lower than the pressure of the first condition in the reactor 110. Under the second condition, the impurities such as salts, the water and a first guest gas are dissociated from the gas hydrates. The first guest gas is a gas the phase equilibrium pressure of which is higher than that of a second guest gas. As the first guest gas is first dissociated under the second condition, pores are formed and become enlarged inside the gas hydrate crystals. As a result, some of the water and impurities such as salts can be efficiently discharged through the pores. The dissociated first guest gas is transferred to a front end of the gas control valve 170 via a first gas resupply pipeline 134, and the dissociated impurities and water are transferred to the reactor 110 via a liquid resupply pipeline 132.

The rinsing tank 140 may completely wash off the impurity components that may remain inside the gas hydrates by supplying a small amount of water through the pores formed inside the gas hydrates in the first dissociation tank 130. The impurity components washed off by the rinsing tank 140 are discharged to a reservoir 144 via a drain pipeline 142. Since the components collected in the reservoir 144 are those with most of the impurities having been removed during the gas hydrate formation and dissociation steps, it will be more economical to supply them again to the reactor 110 as a source of fresh water to save the fresh water.

The second dissociation tank 150 provides the third condition, where the pressure is lower than the pressure of the second condition in the first dissociation tank 130. Under the third condition, the fresh water and the second guest gas are dissociated from the gas hydrates. The dissociated second guest gas is transferred to the front end of the gas control valve 170 via a second gas resupply pipeline 152, and the dissociated fresh water is transferred to a site of demand via a fresh water pipeline 154. In another exemplary embodiment, the first dissociation tank 130 may provide the third condition. In this case, the second dissociation tank 150 can be omitted.

For effective separation of contaminants such as salts in a seawater desalination process or a similar water treatment process based on the gas hydrate method, the dehydration process of separating the impurity-rich residual solution from the hydrates is essential. After the dehydration process, the hydrate crystals become compressed and packed. The most important technical concern in the seawater desalination or water treatment process based on the gas hydrate method is to obtain pure water by efficiently removing/washing off the impurities between the crystals which remain in the dehydrated and compressed solid-state hydrate pellets without being dehydrated.

Figure 2:
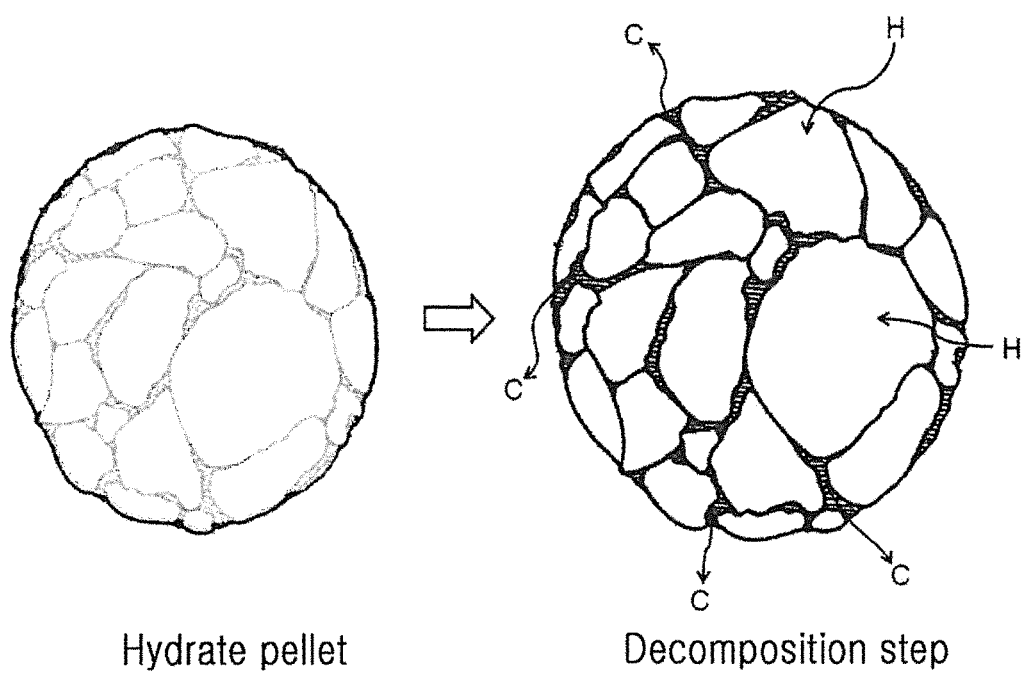
FIG. 2 shows an exemplary shape of a gas hydrate formed in a reactor.

FIG. 2 shows the shape of a gas hydrate pellet which has been dehydrated in the reactor 110 or the dehydration tank 120. Some impurities, salts, etc. remain inside the pellet because complete dehydration is impossible.

While passing through the dissociation tanks 130, 150 and the rinsing tank 140, pores are formed and become enlarged inside the spherical gas hydrate pellet as the first guest gas is dissociated first. As a result, some of the water and the impurities such as salts can be efficiently discharged through the pores. Referring to FIG. 2, the impurities and salts C are removed and only the hydrates H, which are pure water molecules, remain. As such, the desalination process proceeds very efficiently.

Figure 3:
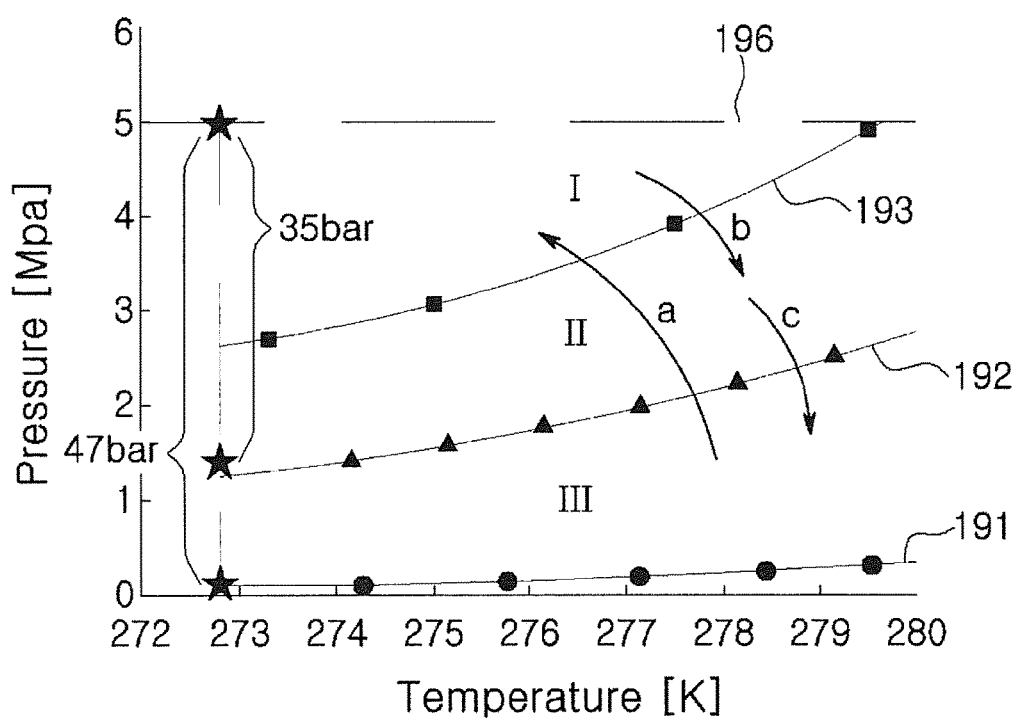
FIG. 3 shows the pressure of phase change of a plurality of guest gases according to the present invention.
Figure 4:
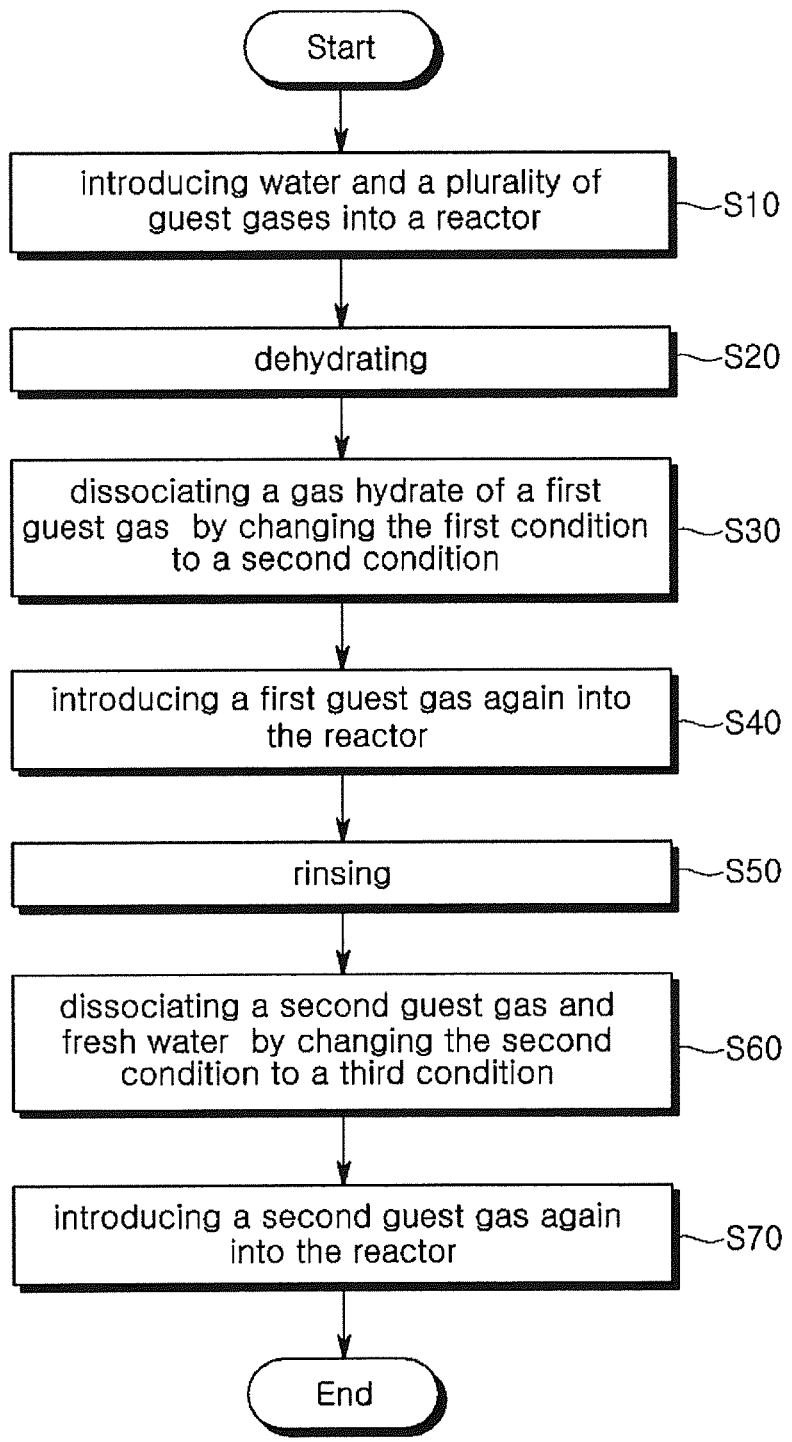
FIG. 4 shows the time-series flow diagram of a method for treating water using a plurality of guest gases according to the present invention.

Next, the kinds and physical properties of the plurality of guest gases used in the present invention will be described referring to FIG. 3. FIG. 3 shows the state of the plurality of gas hydrates, with the abscissa representing temperature and the ordinate representing pressure. The change in the phase equilibrium pressure of the plurality of guest gases depending on the temperature is shown. Although the method according to the present invention is applicable to a temperature range of 273-293 K (0-20° C.), only the range between 273 and 280 K is shown in the figure. The pressure ranges from 0 to 50 atm.

While various molecules can be used as the guest gas to form the gas hydrate as described above, three kinds of gases, i.e., $CH_4$, $CO_2$ and $SF_6$, were selected as exemplary guest gases.

In the graph of FIG. 3, the first curve 191 represents a gas hydrate formed of $CH_4$, the second curve 192 represents a gas hydrate formed of $CO_2$, and the third curve 193 represents a gas hydrate formed of $SF_6$. The dashed horizontal line 196 represents a pressure of 5 MPa, which is the lowest limit where reverse osmosis occurs in general. In FIG. 3, the first area I above the first curve 191 is a region of the first condition where all of $CH_4$, $CO_2$ and $SF_6$ remain as solid-state crystals, the second area II between the first curve 191 and the second curve 192 is a region of the second condition where $CH_4$ is dissociated, and the third area III between the second curve 192 and the third curve 193 is a region of the third condition where $CO_2$ and $SF_6$ are dissociated.

Around 273 K, the phase equilibrium pressure of $CH_4$, $CO_2$ and $SF_6$ is approximately 2.5 MPa, 1.5 MPa and 0.3 MPa, respectively. Since the pressures are significantly lower than the reference pressure of reverse osmosis 5 MPa, the seawater desalination process based on the principle of gas hydrate can be conducted more economically under a low-pressure condition. In particular, when $CO_2$ and $SF_6$ gases are used, the seawater desalination process can be conducted at a pressure about 3.5 MPa and 4.7 MPa lower as compared to the pressure required for reverse osmosis.

Method for Treating Water Using a Plurality of Gases

Hereinbelow, a process of obtaining fresh water by removing impurities from seawater through preparation and dissociation of gas hydrates using two kinds of guest gases $CH_4$ and $CO_2$ will be described referring to FIGS. 1-4. Although $CH_4$ and $CO_2$ were selected among the various guest gases that can be used in the present invention for the purpose of illustration, the present invention is not limited to thereto. For example, $CO_2$ and $SF_6$ may also be selected as the guest gases.

First, in the reactor 110, the third condition corresponding to the third area III is changed to the first condition corresponding to the first area I so as to enable the binding between the supplied water and the guest gases (a). That is to say, gas hydrates are formed by reacting the two kinds of guest gases $CH_4$ and $CO_2$ supplied into the reactor 110 with water (S10).

Then, a gas hydrate slurry formed in step S10 is compressed and dehydrated so as to reduce the volume of the gas hydrates by removing salts and water (S20).

Subsequently, in the first dissociation tank 130, the first guest gas $CH_4$ bound to the gas hydrates is dissociated by changing temperature and pressure to those of the second area II corresponding to the second condition (b) (S30). That is to say, as the first condition is changed to a lower-pressure state of the second area II, $CH_4$ is dissociated from the gas hydrates formed in step S10 and pores are formed inside the gas hydrates. The impurity components that may be present inside the gas hydrate pellets can be efficiently removed through the pores.

Following the step S30, the dissociated first guest gas $CH_4$ may be supplied again to the reactor 110 through the first gas resupply pipeline 134 (S40).

The gas hydrates having the $CH_4$ partly removed are supplied to the rinsing tank 140 and the impurities that may remain inside the gas hydrates may be washed off by supplying water through the pores formed in the gas hydrates (S50).

Subsequently, in the second dissociation tank 150, the second guest gas $CO_2$ bound to the gas hydrates is dissociated by changing temperature and pressure to those of the third area III corresponding to the third condition (c) (S60). That is to say, as the second condition is changed to a lower-pressure state of the third area III, $CO_2$ is dissociated from the gas hydrates and fresh water close to pure water is prepared.

Following the step S60, the dissociated second guest gas $CO_2$ may be supplied again to the reactor 110 through the second gas resupply pipeline 152 (S70).

As described above, the method for treating water using a plurality of guest gases according to the present invention, which is based on the difference in pressure of phase change of the plurality of guest gases supplied to the reactor, allows for effective separation of impurities such as included in the crystallized gas hydrates. That is to say, by preparing the gas hydrates by causing the water and the plurality of guest gases injected into the reactor to react and then sequentially dissociating the plurality of guest gases by lowering the pressure of phase change, the impurities included in the gas hydrates can be removed.

While the exemplary embodiments of the present invention have been described, the present invention is not limited by the specific embodiments. Those skilled in the art will appreciate that the various changes and modifications may be made to the present invention without departing from the spirit and scope of the disclosure as set forth in the appended claims and that such equivalent embodiments are within the spirit and scope of the present invention.

The invention claimed is:

1. A method for treating water using a salt desorption process of gas hydrates, comprising:
    (a) introducing water containing impurities and a plurality of guest gases into a reactor;
    (b) forming gas hydrates by reacting the water with the plurality of guest gases to react under a first condition; and
    (c) starting to dissociate a gas hydrate of any one guest gas from among the plurality of guest gases by changing the first condition to a second condition,
    wherein the first condition refers to temperature and pressure conditions under which all of the plurality of guest gases form gas hydrates and the second condition refers to temperature and pressure conditions under which the any one guest gas from the mixed gas hydrates is dissociated.

2. The method for treating water using a salt desorption process of gas hydrates according to claim 1, wherein the method for treating water further comprises: (d) rinsing the dissociated any one guest gas, the water and the impurities.

3. The method for treating water using a salt desorption process of gas hydrates according to claim 2, wherein the method for treating water further comprises: (e) dissociating a gas hydrate of another guest gas from among the plurality of guest gases by changing the second condition to a third condition, wherein the third condition refers to temperature and pressure conditions under which the gas hydrates of all of the plurality of guest gases are dissociated.

4. The method for treating water using a salt desorption process of gas hydrates according to claim 3, wherein the plurality of guest gases comprise a first guest gas and a second guest gas, wherein the pressure of the second condition under which the first guest gas is dissociated is higher than 5 atm and equal to or lower than 50 atm at 0-20° C. and the pressure of the third condition under which the second guest gas is dissociated is higher than normal pressure and equal to or lower than 20 atm at 0-20° C.

5. The method for treating water using a salt desorption process of gas hydrates according to claim 3, wherein the method for treating water further comprises: (f) dehydrating the formed gas hydrates.

6. The method for treating water using a salt desorption process of gas hydrates according to claim 5, wherein the method for treating water further comprises: (g) introducing at least one guest gas from among the dissociated plurality of guest gases again into the reactor.

7. The method for treating water using a salt desorption process of gas hydrates according to claim 2, wherein the method for treating water further comprises: (h) collecting the rinsed impurities in a reservoir and introducing them again into the reactor.

8. The method for treating water using a salt desorption process of gas hydrates according to claim 1, wherein the method for treating water is applied to any of a group consisting of a seawater desalination process, a wastewater treatment process, a brackish water desalination process, a water purification process, an aquatic resources concentration process and a separation process.

9. The method for treating water using a salt desorption process of gas hydrates according to claim 1, wherein the plurality of guest gases are at least two selected from the group consisting of $CH_4$, $C_2H_6$, $C_3H_8$, $CO_2$, $H_2$, HFCs, PFCs, $Cl_2$ and $SF_6$.

* * * * *